United States Patent [19]

Koivunen

[11] Patent Number: 4,552,545
[45] Date of Patent: Nov. 12, 1985

[54] CENTRIFUGAL PRESSURE COMPENSATOR FOR A VARIABLE DRIVE PULLEY

[75] Inventor: Erkki A. Koivunen, Livonia, Mich.

[73] Assignee: General Motors Corporation, Detroit, Mich.

[21] Appl. No.: 621,857

[22] Filed: Jun. 18, 1984

[51] Int. Cl.$^4$ .............................................. F16H 11/06
[52] U.S. Cl. ........................................ 474/16; 474/28; 474/13
[58] Field of Search ........................ 474/11, 12, 13, 16, 474/28

[56] References Cited

U.S. PATENT DOCUMENTS

| | | | |
|---|---|---|---|
| 3,782,213 | 1/1974 | Rattunde | 474/16 X |
| 3,906,808 | 9/1975 | Zaiser et al. | 474/16 |
| 4,023,425 | 5/1977 | Parker | 474/16 |
| 4,056,015 | 11/1977 | Johannes et al. | 474/28 |
| 4,143,558 | 3/1979 | Deursen et al. | 474/28 |

Primary Examiner—James A. Leppink
Assistant Examiner—Frank McKenzie
Attorney, Agent, or Firm—Donald F. Scherer

[57] ABSTRACT

A pressure compensating mechanism for a dual control piston variable drive pulley has a central chamber disposed between the control pistons. The central chamber is filled with fluid from one of the control passages and is open to exhaust through a controlled restriction. The fluid in the central chamber increases in pressure with increased rotational speed of the pulley to compensate for the centrifugal pressure buildup on one of the control pistons. The controlled restriction establishes the base pressure in the central chamber so that the resultant pressure in the central chamber compensates for centrifugal forces in excess of the centrifugal effect on one of the control pistons thereby compensating, at least partially, for the centrifugal pressure effect on the other of the control piston.

2 Claims, 1 Drawing Figure

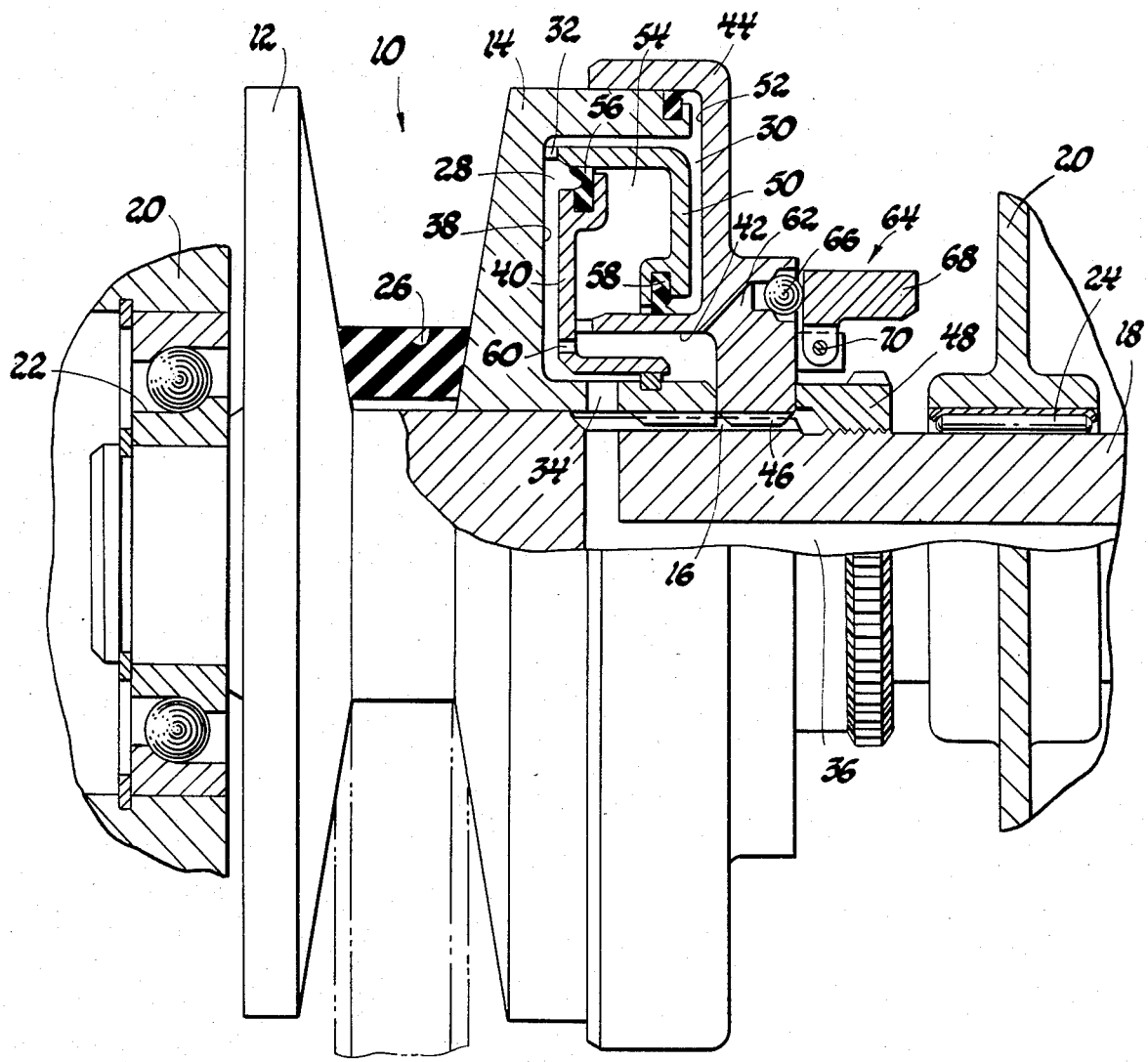

CENTRIFUGAL PRESSURE COMPENSATOR FOR A VARIABLE DRIVE PULLEY

This invention relates to centrifugal pressure compensators and more particularly to centrifugal pressure compensators used in variable ratio pulley drive systems.

In an effort to reduce the diameter of pulley drive systems while not increasing the pressure levels used in the control piston, it is advantageous to utilize dual control pistons. However, such structures do not readily lend themselves to the centrifugal pressure compensating structures which are utilized with single control piston systems.

The present invention provides a structure by which at least a portion of the centrifugal pressure force on a dual control piston structure can be compensated. The present invention also provides a mechanism by which the base pressure level within the compensating mechanism can be controlled such that the total compensating pressure will be at a level higher than the centrifugal pressure alone. The base pressure control mechanism utilizes flow control restrictions, one of which can be centrifugally responsive such that increased base pressure is achieved with increased rotary speed.

It is therefore an object of this invention to provide an improved centrifugal pressure compensator for a variable ratio drive pulley having dual control pistons wherein the pressure compensator has a chamber disposed between the control pistons and is rotatable therewith, and also wherein the chamber is supplied with fluid from one of the control pistons while a controlled exhaust restriction establishes the base pressure in the chamber.

It is another object of this invention to provide an improved centrifugal pressure compensator for use with a dual control piston variable ratio drive pulley, wherein the pressure compensator has a chamber disposed between the control pistons which is supplied with fluid through a restricted passage from one of the control pistons, and wherein the base pressure in the chamber is controlled by a centrifugally actuated exhaust restriction so that the centrifugal pressure compensator generates a resultant compensating force acting against the centrifugal forces generated on both of the control pistons.

Other objects and advantages of the present invention will be more apparent from the following description and drawing which is an elevational view of a drive pulley shown partially in section.

Referring to the drawing, there is seen a variable ratio drive pulley, generally designated 10, having a linearly fixed conical sheave 12 and a linearly movable conical sheave 14. The conical sheaves 12 and 14 are connected for unitary rotary drive through a spline 16 formed on a shaft 18. The shaft 18 can be formed integrally with the conical sheave 12. The shaft 18 is supported for rotation in a relatively stationary housing 20 by a ball bearing 22 and a roller bearing 24. The conical sheaves 12 and 14 cooperate to form the V-shaped portion of pulley 10 in which is disposed a belt 26. The belt 26 is driven through friction forces, by the pulley 10 in a well-known manner.

The drive forces between the pulley 10 and belt 26 are controlled by the axial force imposed on the sheave 14. The belt 26 is connected in a similar manner to a second variable pulley arrangement, not shown. The second pulley arrangement may be constructed in a manner similar to the pulley 10 or in accordance with any of the well-known variable ratio pulley mechanisms. The two pulleys and the belt provide a variable ratio power transmission.

The axial force imposed on movable sheave 14 is generated through pressurized hydraulic fluid which is directed to a pair of chambers 28 and 30. The fluid in chamber 30 enters through a passage 32 from the chamber 28. The fluid in chamber 28 enters through a passage 34, which in turn receives fluid from a control passage 36 formed in the shaft 18. The pressure level in the fluid can be controlled by any of the well-known fluid pressure control systems used with variable ratio belt drives.

The chamber 28 is bounded by an annular end wall 38 formed on conical sheave 14 and a separator wall 40. The annular end wall 38 effectively forms a piston member while the separator wall 40 forms a reaction member. The reaction force on separator wall 40 is absorbed by an annular sleeve or extension 42 formed on an annular housing 44 which is drivingly connected with the shaft 18 through a spline 46 and is limited in its axial movement relative to the shaft 18 by a threaded fastener 48. The chamber 30 is bounded by an annular piston 50 and an annular end wall 52 formed in the housing 44.

It will be evident from the above descriptions of the chambers 28 and 30 that the presence of fluid pressure therein will result in a leftward force on sheave 14 from both end wall 38 and annular piston 50. These fluid pressures will result in rightward forces acting on the separator wall 40 and the end wall 52 of housing 44. Thus, the necessary squeeze or axial forces for the operation of pulley 10 and drive belt 26 can be established. As is well-known, during the rotation of pulley 10, the pressure in chambers 30 and 28 will increase due to the centrifugal forces which will be generated. The generation of these centrifugal forces will result in the axial loads being imposed on the belt 26 being in excess of those required for power transmission.

To compensate for the centrifugal loading, a central compensating chamber 54 is provided. The chamber 54 is annular and is bounded by the separator wall 40 and the annular piston 50. The chamber 54 is sealed from fluid communication with chamber 28 by an annular lip seal 56 and from chamber 30 by an annular lip seal 58. Fluid communication between chamber 28 and compensating chamber 54 is established by a restricted feed passage 60. Thus, fluid will flow into the chamber 54 from the chamber 28. This fluid, during rotation of the pulley 10, will generate a centrifugal pressure in the chambers which will react on the annular piston 50 to compensate for the centrifugal pressure generation in chamber 30. The centrifugal pressure in compensating chamber 54 will also act on the separator wall 40. However, since the separator wall 40 is only a reacting member not in contact with the sheave 14 forces acting on it have no effect on the sheave 14.

The chamber 54 is connected to exhaust through a passage 62. The pressure in passage 62 is controlled by a centrifugal valve, generally designated 64, which is comprised of a ball member 66 and a flyweight 68. The flyweight 68 rotates with the housing 44 and is pivotally mounted on a pin 70 so as to impose a centrifugally generated force on the ball 66. Therefore, the exhausting of fluid from the chamber 54 is controlled by the centrifugal valve 64 such that the base pressure in compensating chamber 54 will increase with inreasing speed of rotation.

As is well-known, the total compensating pressure in compensating chamber 54 will be the sum of the base pressure plus the centrifugal pressure. Therefore, it will become apparent to those familiar with pressure systems that the total compensating pressure in chamber 54 will be greater than the centrifugally generated pressure in chamber 30. Thus, the compensating mechanism of the present invention will provide centrifugal compensation for the pressure in chamber 30 and at least partial centrifugal compensation for the pressure in chamber 28. However, all of the compensating force will develop against the load on annular piston 50 and is limited by the total hydraulic force on that piston.

While only a single centrifugal valve 64 is shown, a plurality of such valves can be equally spaced about the housing 44, if desired. If it becomes desirable to provide a fixed base pressure, it is possible to use a simple restricted outlet passage which will cooperate with the feed restriction passage 60 to establish a fixed base pressure level in chamber 54. The base pressure level in chamber 54 would be established by the pressure in chamber 28 and the size of the restricted passages.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A mechanism providing pressure compensation for a dual area control member in a rotary V-belt drive having adjustable pulleys with a drive belt, said mechanism comprising; a movable pulley sheave including a hub portion; a housing mounted for unitary rotation with said pulley sheave and being secured for permitting relative linear movement on said pulley sheave; a first annular piston slidably disposed on said housing and cooperating with said housing and said pulley sheave to form a first pressure chamber; a separator wall slidably disposed on said pulley sheave and said first piston and cooperating therewith to form a compensating chamber; a second pressure chamber formed between an annular end wall of said pulley sheave and said separator wall with said end wall being operative as a second annular piston; fluid flow passage means for directing pressurized fluid to said first and second pressure chambers and said first and second annular pistons whereby said pulley sheave is urged to move relative to said housing; and first and second restricted flow passages for directing fluid to and from said compensating chamber respectively, said first restricted flow passage being in fluid communication with the pressurized fluid in one of said pressure chambers, said fluid in said compensating chamber being at a pressure level determined in part by the rotary speed of said pulley sheave and acting on said first annular piston in opposition to centrifugally generated fluid pressure in said pressure chambers and thereby reduce the axial loading of the movable pulley sheave.

2. A mechanism providing pressure compensation for a dual area control member in a rotary V-belt drive having adjustable pulleys with a drive belt, said mechanism comprising; a movable pulley sheave including a shaft portion; a housing mounted for unitary rotation with said pulley sheave and being secured for permitting relative linear movement on said pulley sheave; a first annular piston slidably disposed on said housing and cooperating with said housing and said pulley sheave to form a first pressure chamber; a separator wall slidably disposed on said pulley sheave and said first piston and cooperating therewith to form a compensating chamber; a second pressure chamber formed between an annular end wall of said pulley sheave and said separator wall with said end wall being operative as a second annular piston; fluid feed passage means for directing pressurized fluid to said first and second pressure chambers and said first and second annular pistons whereby said pulley sheave is urged to move relative to said housing; and first and second restricted flow passage means for directing fluid to and from said compensating chamber respectively, said first restricted flow passage means being in fluid communication with the pressurized fluid in one of said pressure chambers, said second restricted flow passage means including centrifugally actuated valve means for controlling the exhausting of fluid from the compensating chamber, said fluid in said compensating chamber being at a pressure level determined in part by the rotary speed of said pulley sheave and acting on said first annular piston in opposition to the pressure force in said first pressure chamber to provide at least partial compensation for the centrifugally generated fluid pressure in said pressure chambers.

* * * * *